United States Patent
Dyson

(10) Patent No.: US 9,169,855 B1
(45) Date of Patent: Oct. 27, 2015

(54) FLOW DIODE AND METHOD FOR CONTROLLING FLUID FLOW ORIGIN OF THE INVENTION

(75) Inventor: Rodger W Dyson, Elyria, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 555 days.

(21) Appl. No.: 13/474,972

(22) Filed: May 18, 2012

(51) Int. Cl.
| | |
|---|---|
| *F15C 1/06* | (2006.01) |
| *F15C 1/08* | (2006.01) |
| *F15C 1/12* | (2006.01) |
| *F17D 1/16* | (2006.01) |
| *F17D 1/18* | (2006.01) |
| *F15C 5/00* | (2006.01) |
| *F15C 1/14* | (2006.01) |
| *F15D 1/12* | (2006.01) |

(52) U.S. Cl.
CPC . *F15C 5/00* (2013.01); *F15C 1/146* (2013.01); *F15D 1/12* (2013.01); *Y10T 137/0396* (2015.04); *Y10T 137/2185* (2015.04); *Y10T 137/2224* (2015.04)

(58) Field of Classification Search
CPC .............. F15C 1/12; F15C 1/146; F15C 5/00; Y10T 137/2224; Y10T 137/0396; Y10T 137/2185
USPC .................................... 137/14, 814, 826, 833
See application file for complete search history.

(56) References Cited

U.S. PATENT DOCUMENTS

| | | | |
|---|---|---|---|
| 2,727,535 | A | 12/1955 | Linderoth |
| 3,191,623 | A | 6/1965 | Bowles |
| 3,657,930 | A | 4/1972 | Jacobson |
| 3,667,234 | A | 6/1972 | De Lizasoain |
| 4,068,144 | A | 1/1978 | Toye |
| 5,265,636 | A | 11/1993 | Reed |
| 5,876,187 | A | 3/1999 | Afromowitz et al. |
| 6,227,809 | B1 | 5/2001 | Forster et al. |
| 7,753,656 | B2 | 7/2010 | Lemoff et al. |

OTHER PUBLICATIONS

U.S. Appl. No. 13/226,559, filed Feb. 3, 1920, N. Tesla.
Dyson, Rodger; "Using Micro-Fluidic Tesla Diode Cascades to Eliminate the Gas Bearing Check Valve" Oct. 21, 2011; d-NTR#:1319205972.
Dyson, Rodger; "Cascading Tesla Oscillating Flow Diode for Stirling Engine Gas Bearings"; Apr. 6, 2012; Tech Brief—Mechanics/Machinery category.

*Primary Examiner* — John K Fristoe, Jr.
*Assistant Examiner* — Kelsey Rohman
(74) *Attorney, Agent, or Firm* — Robert H. Earp, III

(57) ABSTRACT

A flow diode configured to permit fluid flow in a first direction while preventing fluid flow in a second direction opposite the first direction is disclosed. The flow diode prevents fluid flow without use of mechanical closures or moving parts. The flow diode utilizes a bypass flowline whereby all fluid flow in the second direction moves into the bypass flowline having a plurality of tortuous portions providing high fluidic resistance. The portions decrease in diameter such that debris in the fluid is trapped. As fluid only travels in one direction through the portions, the debris remains trapped in the portions.

19 Claims, 6 Drawing Sheets

FLOW DIODE AND METHOD FOR CONTROLLING FLUID FLOW

ORIGIN OF THE INVENTION

The invention described herein was made by employees of the United States Government and may be manufactured and used by or for the Government for Government purposes without the payment of any royalties thereon or therefore.

BACKGROUND OF THE DISCLOSURE

In many fluid transport applications, it is advantageous to permit fluid flow in one direction while preventing reverse flow. This function is generally provided by a valve having a mechanical closure configured to move against a wall of the valve to prevent fluid flow in one direction.

For example, a check valve, clack valve, non-return valve or one-way valve is a mechanical device that permits fluid to flow through it in only one direction. Check valves are two-port valves, meaning they have two openings in the body, one for fluid to enter and the other for fluid to leave. There are various types of check valves used in a wide variety of applications.

Check valves are also frequently used to control fluid pressure in a cavity or across a fluid conduit. Fluid is permitted to flow in one direction until a certain, predetermined pressure is achieved. Then, the valve actuates to prevent fluid movement into the cavity or conduit.

No matter what application, reliability of valves is essential for proper operation and for maintaining the pressure. Very often if the fluid contains particles or debris, the mechanical closure becomes stuck such that it becomes a barrier for the fluid flowing in the desired direction. In addition, like any mechanical component with moving parts, one of the mechanical parts may fail. Depending on the application, such a mechanical failure can cause further damage to the respective system or possibly even failure of an entire system. Accordingly, there is a need in the industry for an apparatus for controlling fluid flow having improved reliability and/or fewer mechanical components.

SUMMARY OF DISCLOSURE

In an embodiment of the disclosure, a flow diode comprising a main flowline configured to transport fluid in a first direction from a first end of the flow diode to a second end of the flow diode is disclosed. The flow diode can have a bypass flowline having a plurality of portions in fluid communication with the main flowline. Each of the plurality of portions can have an entry and an exit in fluid communication with the main flowline. The exit can be located at a linear distance from the entry, and the exit and the entry can be positioned between the first end and the second end of the flow diode. A diameter of each of the portions can be greater at the entry than at the exit. Nearly all of the fluid transported in the first direction can pass through the main flowline, and nearly all of the fluid transported in a second direction opposite the first direction can pass into the bypass flowline.

In another embodiment of the disclosure, a microfluidic main flowline can transport fluid in a first direction and can be shaped to minimize pressure change along the microfluidic flowline. A first portion of a microfluidic bypass flowline can have an entry and an exit in fluid communication with the main flowline, the entry and the exit can be separated by a longitudinal distance along the main flowline. The first portion of the microfluidic bypass flowline can be shaped to only transport fluid in a second direction opposite the first direction. Nearly all of the fluid flow in the second direction passing through the exit of the first portion can pass into an entry of a second portion of the microfluidic bypass flowline.

In yet another embodiment of the disclosure, a method is disclosed. The method can transport fluid through a main flowline in a first direction from a first end of a flow diode to a second end of a flow diode, and can move the fluid in a second direction opposite the first direction. Furthermore, the method includes preventing the fluid from passing out of the flow diode by providing a bypass flowline in fluid communication with the main flowline. The bypass flowline can have a plurality of portions each having an entry and an exit in fluid communication with the main flowline. The exit can be located at a linear distance from the entry. A diameter of at least one of the plurality of portions can be greater at the entry than at the exit. The method can include trapping debris in the bypass flowline. The first portion of the plurality of portions of the bypass flowline comprises at least two flow channels sized to trap the debris, and each of the flow channels can have a diameter smaller than a diameter of the entry of the first portion. The flow channels are positioned between the entry and the exit of the first portion, and at least a portion of the fluid passing through the first portion passes through the at least two flow channels.

DETAILED DESCRIPTION OF EMBODIMENTS OF THE DISCLOSURE

Embodiments of the present disclosure generally describe a flow diode and method for controlling fluid flow. While embodiments of the present disclosure are described as being implemented in an engine, such as a stirling engine, a person having ordinary skill in the art will appreciate that the flow diode may be implemented into numerous systems in various industries. For example, the flow diode may be implemented into any system in which the control of fluid flow may be desired, or any system where it is desirable to control the direction of fluid flow, such as limiting movement of fluid flow in only one direction. The flow diode may be used in any system in which it may be beneficial to trap or collect debris.

Figure 1:
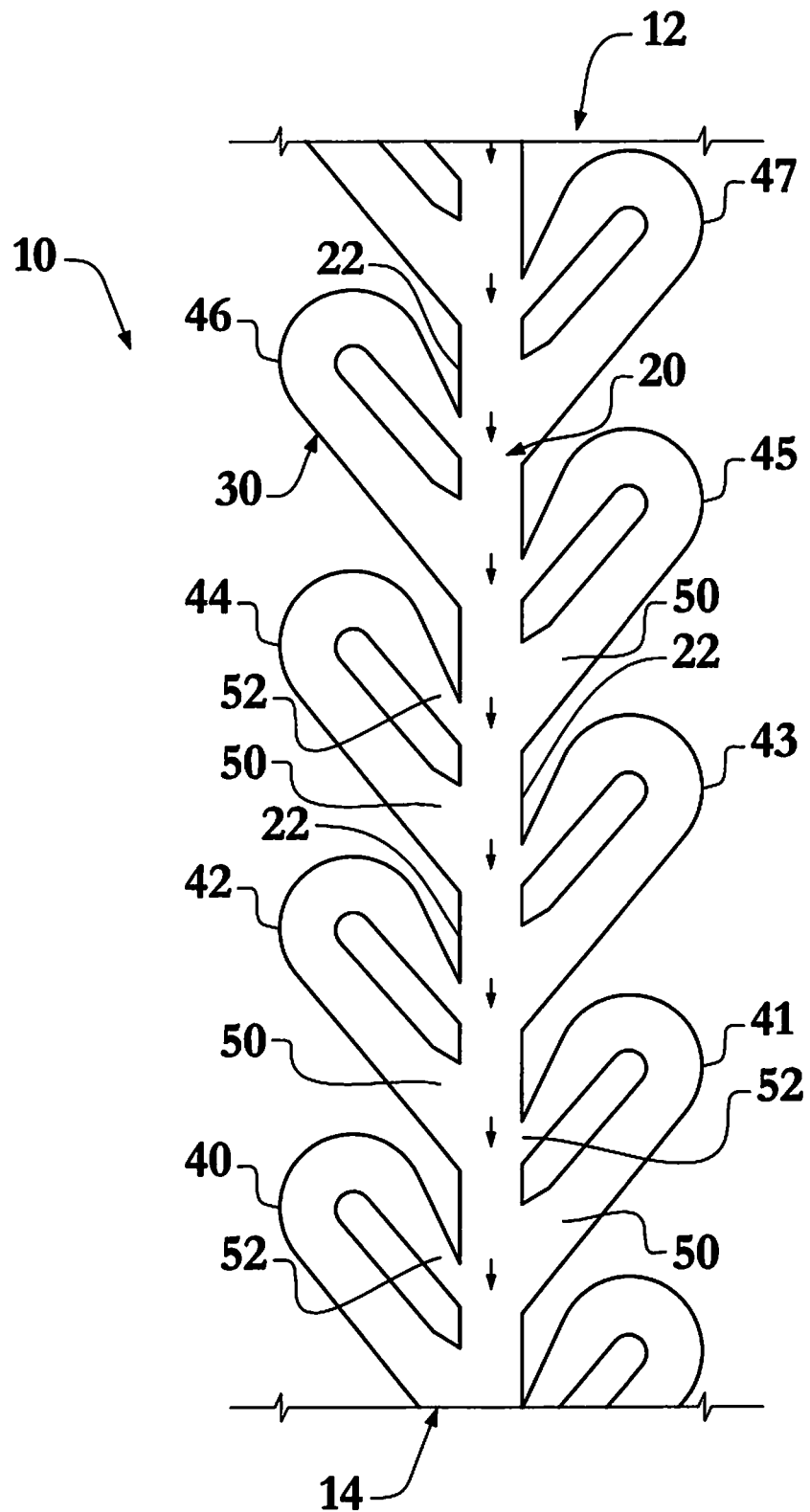
FIG. 1 illustrates fluid flowing in a first direction in a flow diode in an embodiment of the disclosure.

FIG. 1 illustrates a flow diode 10 having an axial, linear length defined between a first end 12 and a second end 14. The flow diode 10 can be used to transport fluid along the axial length between the first end 12 and the second end 14. As shown in FIG. 1, the fluid may travel in a first direction from the first end 12 to the second end 14 of the flow diode 10. The first direction is generally along a longitudinal axis of the flow diode 10 in a direction from the first end 12 to the second end 14. In one or more embodiment, the flow diode 10 can be used to permit fluid flow in the first direction while preventing fluid flow beyond the second end 14 in a second direction opposite the first direction. For example, fluid can flow in the first direction from the first end 12 to the second end 14 and out of the flow diode 10. Fluid can flow from the second end 14 in the second direction toward the first end 12 and be prevented from exiting the flow diode 10 beyond the second end 14. The second direction is generally along the axis of the flow diode 10 in a direction from the second end 14 to the first end 12. The flow diode 10 can prevent all or at least nearly all of the fluid from exiting the flow diode 10 in the second direction. The fluidic resistance to fluid flow in the second direction may be substantially greater than the fluidic resistance in the first direction. In the first direction, it may be advantageous for the fluidic resistance to be minimized in the first direction such that fluid can flow through the flow diode 10 with only negligible or minimum pressure loss.

A main flowline 20 extends from the first end 12 to the second end 14. The main flowline 20 can be substantially or completely straight between the first end 12 and the second end 14. For example, a cross-section of the main flowline 20, as shown in FIG. 1, illustrates that the edges 22 of the main flowline 20 are parallel along the entire axial length of the flow diode 10. As a result, pressure loss is minimized for fluid traveling through the main flowline 20. The main flowline 20 is sized and shaped such that nearly all fluid flow in the first direction moves through the main flowline 20. The size and shape of the main flowline 20 may be based on a type of fluid passing through the main flowline 20, such as liquid or gas. The size and shape of the main flowline 20 may be based on a properties of or composition of the fluid passing through the main flowline 20, non-limiting examples of which include molecular composition, molecular weight, viscosity, pressure, temperature and density.

Figure 2:
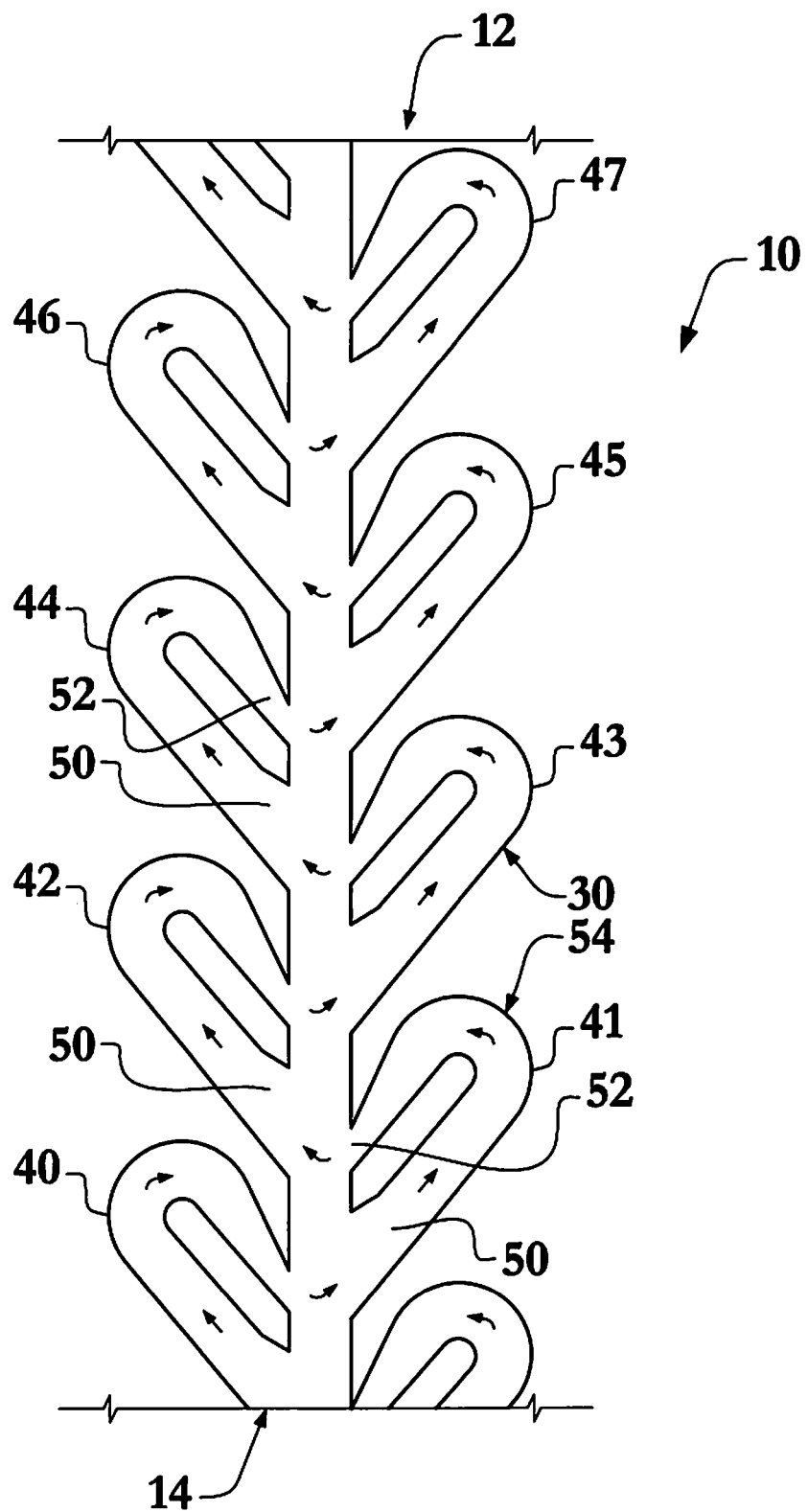
FIG. 2 illustrates fluid flowing in a second direction, opposite the first direction of FIG. 1, in a flow diode in an embodiment of the present disclosure.

A bypass flowline 30 is positioned between the first end 12 and the second end 14 of the flow diode 10. The bypass flowline 30 is a flowline sized and shaped to receive fluid flow in the second direction opposite the first direction, as shown in FIG. 2. In an embodiment, all or at least nearly all of the fluid flowing in the second direction flows into the bypass flowline 30. The bypass flowline 30 is sized and shaped to provide fluidic resistance such that fluid flow out of the fluid diode 10 in the second direction is completely or nearly completely prevented. Advantageously, the bypass flowline 30 prevents fluid flow out of the fluid diode 10 without any moving components or parts.

The bypass flowline 30 may include one or more portions 40-47 in fluid communication with the main flowline 20. The portions 40-47 may be positioned on opposing sides of the main flowline 20. Each of the portions 40-47 may have an entry 50 and an exit 52 in fluid communication with the main flowline 20. The exit 52 and the entry 50 may be in fluid communication with the main flowline 20 at different axial positions. As an example, the entry 50 and the exit 52 may be separated by an axial length or linear distance. A diameter of each of the portions 40-47 can be greater at the entry 50 than at the exit 52. The diameter of each of the portions 40-47 may decrease from the entry 50 to the exit 52. A shape of the entry 50 may be selected based on properties of the fluid, such as state, type, composition, viscosity, density, molecular weight and etc. The size and shape of the entry 50 can be selected such that nearly all fluid flowing in the second direction passes into the bypass flowline 30.

The entry 50 and the exit 52 provide an opening permitting flow from the bypass flowline 30 across the main flowline 20. The bypass flowline 30 may provide a tortuous path for fluid flow. The portions 40-47 can each have a shape to create substantial fluidic resistance, which may include on or more bends, curves or turns. For example, as shown in FIGS. 1 and 2, the portions 40-47 have a half-heart shape such that from the entry 50 of each of the portions 40-47, the portions 40-47 extend away from the main flowline 20 and in the radial direction (e.g. away from the longitudinal axis) and then extend into fluid communication with the main flowline 20 at the exit 52. While the fluid flowing in the second direction is generally moving through the bypass flowline 30 from the second end 14 to the first end 12, the fluid flowing through one of the portions 40-47 can be moved in a number of directions before passing into a subsequent one of the portions 40-47 closer to the second end 14 of the flow diode. For example, the portions 40-47 as shown in FIGS. 1-3 has a first section generally moving the flow at an acute angle with respect to the second direction and then moving the flow at an acute angle with respect to the first direction prior to exiting one of the portions 40-47 at the exit 52.

The exit 52 of one of the portions 40-47 can align with the entry 50 of another one of the portions 40-47. For example, the exit 52 of a first portion 40 can align with the entry 50 of a second portion 41. The first portion 40 and the second portion 41 may be separated by the main flowline 20. The portions 40-47 may be positioned such that fluid may cascade into one of the portions 40-47 and into an adjacent one of the portions 40-47. In the second direction, all or at least nearly all of the fluid flowing out of the exit 52 of one of the portions 40-47 can flow across the main flowline 20 and into the entry 50 of one of the other portions 40-47. For example, substantially or nearly all fluid flowing out of the exit 52 of a first portion 40 can flow into an entry 50 of a second portion 41. The first portion 40 is positioned closer to the first end 10 than the second portion 41. Any fluid travelling through the exit 52 of the first portion 40 and into the entry 50 of the second portion 41 may cross the main flowline 20. Fluid may continue to flow in the second direction from the exit 52 of the second portion 41 and into the entry 50 of a third portion 42.

Figure 3:
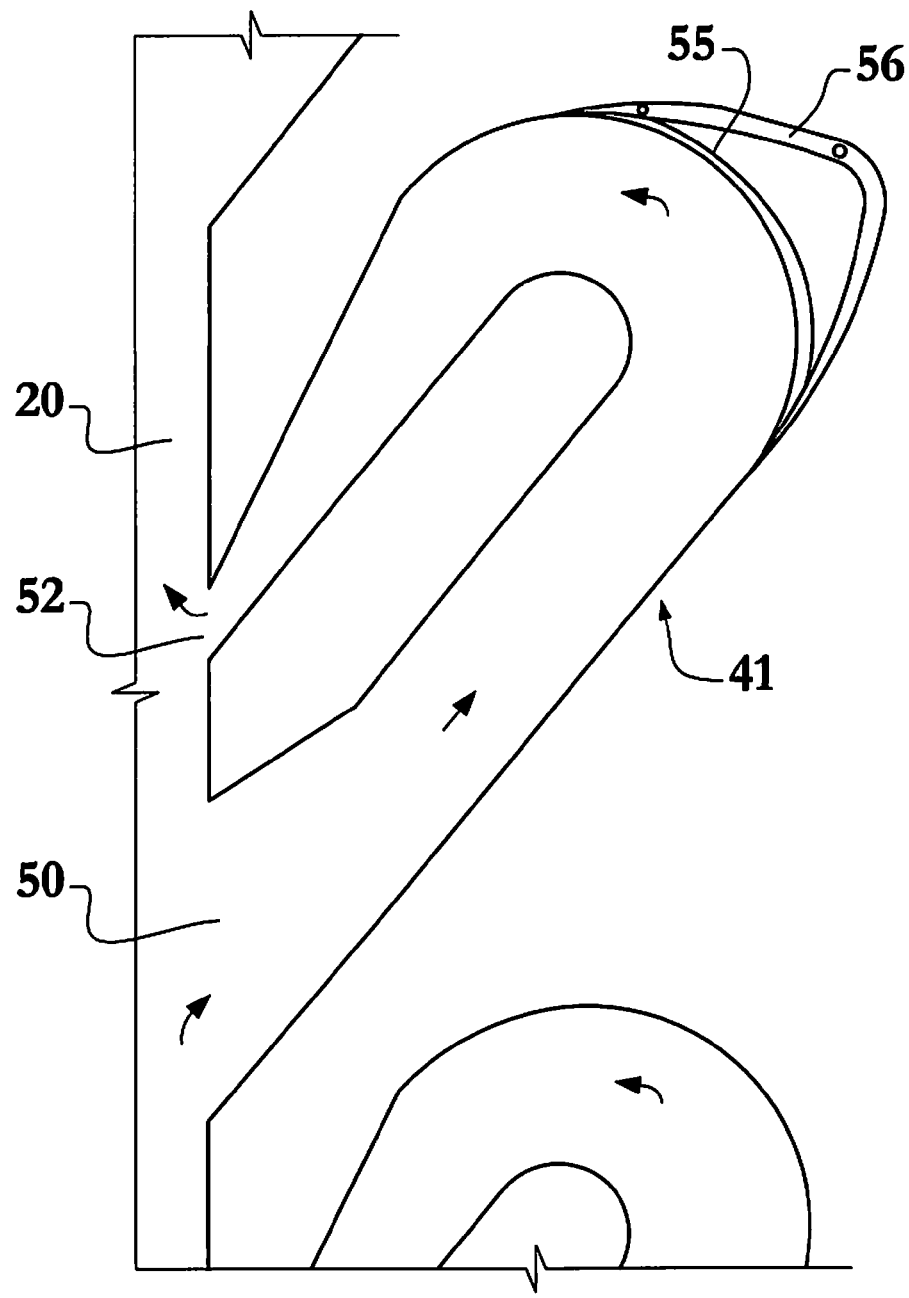
FIG. 3 illustrates a flow diode with a bypass flowline having multiple flow channels in an embodiment of the present disclosure.

FIG. 3 illustrates an enlarged view of the second portion 41 in an embodiment of the disclosure. As shown in FIG. 3, a diameter of the entry 50 may be substantially larger than the exit 52. The entry 50 can have a substantially larger diameter than the portion 40-47 between the entry 50 and the exit 52. The diameter of the second portion 41, for example, may be constant about a highly deviated or angled section 54 of the second portion 41 and may decrease substantially from the highly deviated section 54 to the exit 52. For example, a diameter of the second portion 41 adjacent the exit 52 may decrease substantially such that debris or other undesirable material in the fluid may be prevented from passing into another one of the portions 42-48 and the main flowline 20. As the diameter decreases toward the exit 52, the fluidic resistance may increase to aid in preventing fluid flow in the second direction.

FIG. 3 illustrates an example of one of the portions 40-47, namely the second portion 41, having flow channels 55, 56 that can receive fluid flowing through one of the portions 40-47. The flow channels 55, 56 may only receive fluid flowing through one of the portions 40-47, which may only occur when fluid is flowing in the second direction. Fluid flowing through the flow channels 55, 56 can only travel in one direction, namely toward the exit 52 of one of the portions 40-47. The flow channels 55, 56 can be internal or external with respect to the portions 40-47. For example, the flow channel 55 may be internal with respect to the second portion 41 such that the flow channel 55 may partition or otherwise divide the flow of fluid moving through the second portion 41. The flow channel 56 may be external to the second portion 41 such that the flow channel 56 extends away from the second portion 41 and diverts a portion of fluid traveling through the second portion 41. Part of the fluid flowing into the second portion 41 can flow into the flow channel 55 and the remaining portion of the fluid can flow into the flow channel 56 and/or the second portion 41. The second portion 41 is illustrated as a non-limiting example. It should be understood that one, two or more, or all of the portions 40-47 may have the flow channels 55, 56. Furthermore, it will also be appreciated by those having ordinary skill in the art that the disclosure shall not be deemed as limited to only two of the flow channels 55, 56, as any number of the flow channels 55, 56 may be utilized to provide resistance to fluid flow in the second direction and collect or filter debris in the fluid. The flow channels 55, 56 may extend from the entry 50 to the exit 52 or only a section of the second portion 41, as shown in FIG. 3.

The flow channels 55, 56 may be sized to filter or otherwise collect debris in the fluid. The flow channels 55, 56 may each have a diameter smaller than the entry 50 and smaller than the diameter of the portions 40-47 between the entry 50 and the flow channels 55, 56. The diameter of the flow channels 55, 56 may be sized smaller than a size of potential debris in the fluid. As a result, the debris can be lodged in the flow channels 55, 56 and can be prevented from exiting the portions 40-47. As the fluid flow through the flow channels 55, 56 can be in one direction only, the debris can remain trapped in the flow channels 55, 56.

In an embodiment, the main flowline 20 and the bypass flowline 30 may be microfluidic flowlines. For example, the main flowline 20 and the bypass flowline 30 may be manufactured using any known method of manufacturing micromachines or microelectromechanical systems (MEMS), such as by an etching process. The main flowline 20 and the bypass flowline 30 may be formed by etching one or more substrates. For example, a first substrate having a first section of each of the main flowline 20 and the bypass flowline 30 may be etched and combined with a second substrate etched with a second section of each of the main flowline 20 and the bypass flowline 30. The first section can be a top half and the second section may be a bottom half of the main flowline 20 and the bypass flow line 30. The present disclosure should not be deemed to etching, wet or dry etching, in an embodiment where the main flowline 20 and the bypass flowline 30 are microfluidic flowlines. The main flowline 20 and the bypass flowline 30 may be formed as microfluidic flowlines in any method that is known or will be known by those having ordinary skill in the art of manufacturing microfluidic devices.

Figure 4:
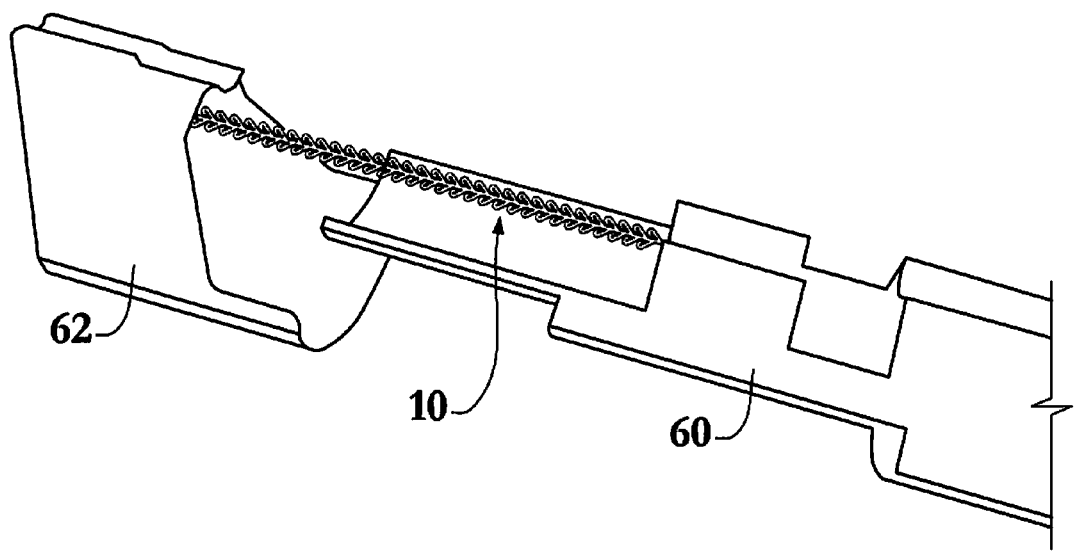
FIG. 4 illustrates a flow diode positioned between a first component and a second component in an embodiment of the present disclosure.

FIG. 4 illustrates the flow diode 10 positioned between a first component 60 and a second component 62. The flow diode 10 may permit fluid from flowing in the first direction from the first component 60 to the second component 62. Fluid flow from the second component 62 to the first component may be prevented by the flow diode 10. As mentioned above, the flow diode 10 may be incorporated into and/or used in many applications. One such non-limiting example is for use in a stirling engine, such as in the aeronautical industry. The flow diode 10 may be positioned between a fluid plenum 60 and a compression space 62 of the stirling engine as shown in FIG. 4.

In a non-limiting example, the flow diode 10 can be incorporated into a stirling engine between the fluid plenum 60 and the compression space 62. The main flowline 20 and the bypass flowline 30 may be micro fluidic flowlines. In the case where the fluid is helium, the main flowline 20 may be approximately 100 microns in diameter, and the bypass flowline 30 may have an average diameter of 1-20 microns. The diameter of the bypass flowline 30 can decrease between the entry 50 and the exit 52 as previously set forth. It will be appreciated by those having ordinary skill in the art that the disclosure should not be deemed as limited to any dimension and that the dimensions provided herein are for explanatory purposes. In addition, the dimensions of the main flowline 20, the bypass flowline 30 and other components of the flow diode 10 can be modified depending on the type of fluid being transported therethrough.

Figure 5:
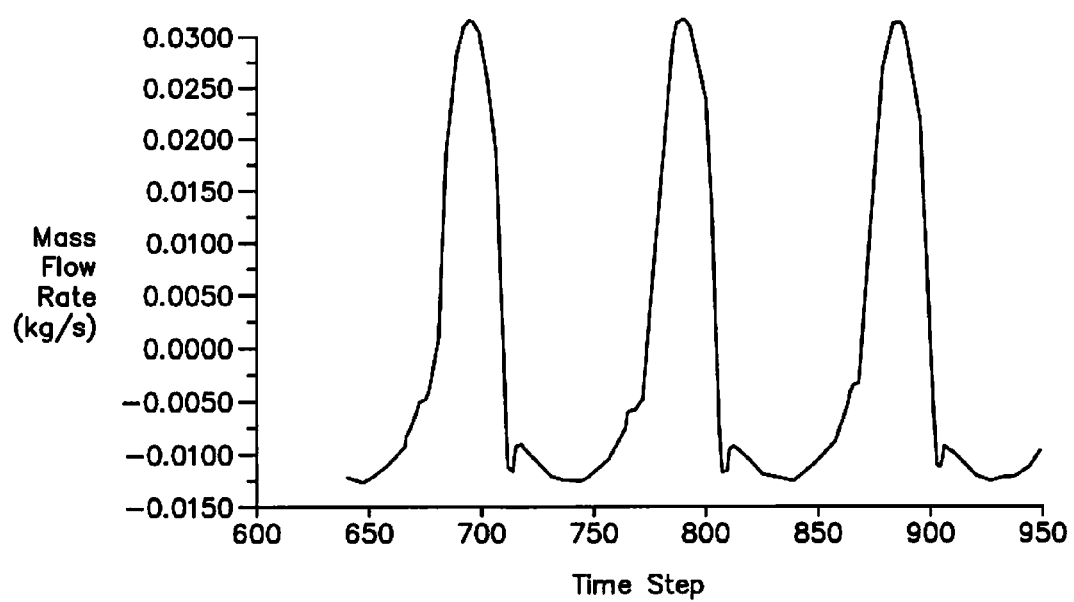
FIG. 5 is a graphical representation illustrating relative fluid flow in the first direction and the second direction in an embodiment of the present disclosure.
Figure 6:
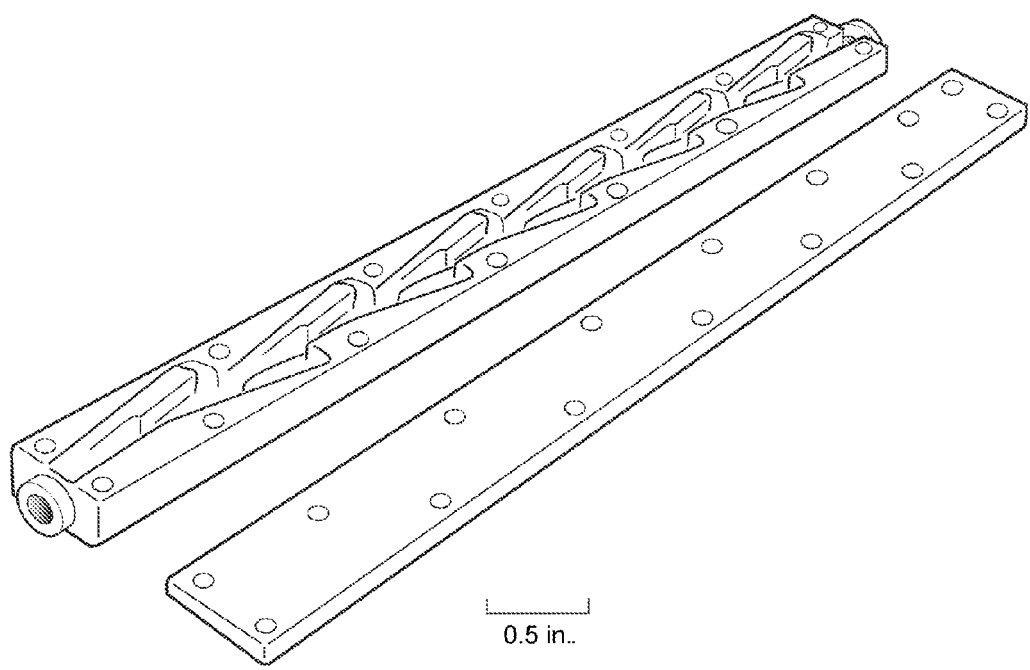
FIG. 6 is an illustration showing the microfluidic flowlines etched into a substrate.

FIG. 5 is a graphical representation illustrating that the flow diode 10 may be used to prevent nearly all fluid flow in the second direction. Fluid flow in the first direction is accomplished with minimal resistance. In the previous example, the helium gas can easily travel in the first direction between the fluid plenum 60 and the compression space 62. Flow in the second direction between the compression space 62 and the fluid plenum is prevented by the fluidic resistance of the flow diode 10.

The fluidic resistance in the second direction is provided by the bypass flowline 30 having the plurality of portions 40-47 each having the entry 50 and the exit 52. The exit 52 is located at a linear distance from the entry 50. A diameter of at least one of the plurality of portions 40-47 is greater at the entry 50 than at the exit 52. Debris may be trapped in the bypass flowline 30, such as in one of the flow channels 55, 56 sized to trap the debris. Each of the flow channels 55, 56 can have a diameter smaller than a diameter of the entry 50. All or at least nearly all of the fluid moving out of the exit 52 of one of the portions 40-47 can move into the entry of another one of the portions 40-47.

The invention claimed is:

1. An apparatus comprising:
 a flow diode comprising:
  a main flowline configured to transport fluid in a first direction from a first end of the flow diode to a second end of the flow diode;
  a bypass flowline having a plurality of portions in fluid communication with the main flowline, each of the plurality of portions having an entry and an exit in fluid communication with the main flowline, the exit located at a linear distance from the entry, the exit and the entry positioned between the first end and the second end of the flow diode, wherein a diameter of each of the portions is greater at the entry than at the exit, and further wherein a majority of the fluid transported in the first direction passes through the main flowline and a majority of the fluid transported in a second direction opposite the first direction passes into the bypass flowline.

2. The apparatus of claim 1 wherein a majority of the fluid transported in the second direction and moving through the exit of a narrow region in the loop of a first portion of the plurality of portions moves into an entry of a wide region in the loop of a second portion of the plurality of portions.

3. The apparatus of claim 1 wherein the plurality of portions are shaped such that debris in the fluid is trapped in the plurality of portions adjacent the exit.

4. The apparatus of claim 1 wherein the main flowline is straight and minimizes pressure change and fluidic resistance in the first direction between the first end and the second end of the flow diode.

5. The apparatus of claim 1 wherein fluid flow in the second direction has a fluidic resistance substantially greater than a fluidic resistance in the first direction.

6. The apparatus of claim 1 wherein at least one of the plurality of portions has a plurality of flow channels each having a diameter less than a diameter of the bypass flowline at the entry, and further wherein each of the plurality of flow channels are sized to capture debris in the fluid.

7. The apparatus of claim 1 wherein fluid flow in the second direction is forced into the bypass flowline and is substantially prevented from passing out of the flow diode without any moving parts or components.

8. The apparatus of claim 1 wherein the flow diode is a micro fluid flow diode and the main flow line and the secondary flow line are microfluidic flowlines positioned between a gas plenum and a compression space of a stirling engine.

9. The apparatus of claim 8 wherein the microfluidic flowlines are etched into a substrate.

10. An apparatus comprising:
a microfluidic main flowline to transport fluid in a first direction and shaped to minimize pressure change along the microfluidic flowline; (and)
a first portion of a microfluidic bypass flowline having an entry and an exit in fluid communication with the main flowline, the entry and the exit separated by a longitudinal distance along the main flowline, wherein the first portion of the microfluidic bypass flowline is shaped to only transport fluid in a second direction opposite the first direction, wherein a majority of the fluid flow in the second direction passing through the exit of the first portion passes into an entry of a second portion of the microfluidic bypass flowline; and
wherein the microfluidic bypass flowline has a greater diameter at the entry than at the exit.

11. The apparatus of claim 10 wherein resistance to fluid flow in the second direction is substantially greater than the first direction.

12. The apparatus of claim 11 wherein the main flowline is straight and minimizes pressure loss as fluid moves in the first direction from a first end to a second end of the flow diode.

13. The apparatus of claim 10 wherein each portion has at least two flow channels in which fluid may move, each of the flow channels having a diameter smaller than a diameter of the bypass flowline at the entry, and further wherein the flow channels are sized to trap debris.

14. The apparatus of claim 10 wherein a diameter of the main flowline and a diameter of the bypass flowline at the entry and the exit is selected based on properties of the fluid being transported therethrough such that substantially all of the fluid in the second direction flows into the bypass flowline.

15. A method comprising:
transporting fluid through a main flowline in a first direction from a first end of a flow diode to a second end of a flow diode;
moving the fluid in a second direction opposite the first direction;
preventing the fluid from passing out of the flow diode by providing a bypass flowline in fluid communication with the main flowline, the bypass flowline having a plurality of portions each having an entry and an exit in fluid communication with the main flowline, the exit located at a linear distance from the entry, wherein a diameter of at least one of the plurality of portions is greater at the entry than at the exit; and
trapping debris in the bypass flowline, wherein a first portion of the plurality of portions of the bypass flowline comprises at least two flow channels sized to trap the debris, each of the flow channels having a diameter smaller than a diameter of the entry of the first portion, the flow channels are positioned between the entry and the exit of the first portion, and further wherein at least a portion of the fluid passing through the first portion passes through the at least two flow channels.

16. The method of claim 15 wherein the fluid is prevented from moving in the second direction out of the flow diode based on the dimensions and shape of a first bypass flowline and a second bypass flowline.

17. The method of claim 15 wherein the main flowline, a first bypass flowline, and a second bypass flowline are micro flowlines etched into a substrate.

18. The method of claim 15 further comprising positioning the first end of the flow diode adjacent a gas plenum and a second end of the flow diode adjacent a compression space of a stirling engine.

19. The method of claim 15 wherein the first portion and the second portion are separated by the main flowline.

* * * * *